Patented May 2, 1950

2,506,539

UNITED STATES PATENT OFFICE 2,506,539

FUEL FOR INTERNAL-COMBUSTION SPARK IGNITION ENGINES

Harold Boardman, Vancouver, British Columbia, Canada, assignor to Carboline Limited, Vancouver, British Columbia, Canada No Drawing. Application July 7, 1944, Serial No. 543,952

14 Claims. (Cl. 44—68)

This invention relates to the art of fuels for internal combustion spark ignition engines. More particularly, it relates to a novel catalyst for said fuels and to improved fuels, particularly gasoline, comprising said catalyst.

Various attempts have been made in the past to increase the efficiency of liquid fuels, such as gasoline, in internal combustion spark ignition engines. For instance, it has been discovered that certain oil-soluble metal organic compounds, such as tetraethyl lead, have the property of suppressing detonation or knock in spark ignition engines, i. e., of increasing the octane-rating of the fuel. These compounds are generally known as antiknock compounds and their addition, particularly the addition of tetraethyl lead to gasoline, is now practiced widely. While said antiknock compounds do provide fuels which have markedly superior octane-ratings, they, unfortunately, do not afford as high an output of work per unit weight of fuel consumed as is desired. In an attempt to increase said output of work, it has been proposed to add to the fuel organic nitro compounds or nitrates in an amount, for example, of from 0.5% to 5% or more, based on the weight of the fuel. While said addition has been successful in the case of fuels employed in compression ignition engines of the Diesel type, it has not produced satisfactory results in fuels used in spark ignition engines. As stated in the Journal of the Institute of Petroleum Technology, vol. 13, April, 1937, pp. 273–280, organic nitro compounds and nitrates appear to promote knocking. Consequently, even though the addition of organic nitro compounds produces fuels which provide increased output of work per unit weight of fuel consumed, said fuels have too low an octane-rating and are thus not adapted for use in modern high compression spark ignition engines.

I have now discovered a catalytic mixture which, when added in minute proportions to liquid fuels, especially gasoline, not only increases to an extent greater than hitherto thought possible the output of work obtained per unit weight of fuel consumed in internal combustion spark ignition engines, particularly high compression spark ignition engines, but also does not promote knocking.

Accordingly, this invention has as an object the provision of improved internal combustion engine fuels. A further object is the provision of a catalyst for said fuels which, when added thereto in minute amounts, markedly improves the combustion thereof in internal combustion spark ignition engines.

A still further object is the production of a fuel for internal combustion spark ignition engines, particularly gasoline, containing minute amounts of a novel catalyst, which fuel, when used in an internal combustion spark ignition engine, provides substantially lower percentages of combustible gases in the exhaust gases, a much higher output of work per unit volume of fuel consumed, improved anti-knock properties, and a substantial increase in the maximum power that the engine can deliver without stalling.

It is also among the particular objects of this invention to permit a reduction in the weight of internal combustion engines required for any given power output; to reduce the percentage of poisonous carbon monoxide in internal combustion engine exhaust gases; and to suppress the accumulation of carbon on the interior surfaces of internal combustion engines, particularly the spark plugs and cylinders of said engines.

Additional objects will become apparent from an examination of the following description and claims.

These and other objects and advantages are accomplished by the herein described invention which broadly comprises adding to an internal combustion spark ignition engine fuel a small percentage by weight of a mixture of an aromatic metal-free nitro compound and an iron salt of an aromatic nitro acid.

In a more restricted sense, this invention comprises adding to a liquid hydrocarbon fuel for internal combustion spark ignition engines a small percentage by volume of a dilute solution of a mixture of an aromatic nitro acid and a ferrous salt of an aromatic nitro acid, the ratio of salt to acid by weight in said mixture being within the range of from $\frac{1}{10}$ to $1/100$.

A preferred embodiment of this invention comprises adding to gasoline about 0.004% by weight of a mixture of 1 part by weight of ferrous picrate and 44 parts by weight of picric acid dissolved in a suitable solvent, preferably a solution consisting of 5.7% by weight of the mixture of ferrous picrate and picric acid, 8.6% by weight of methylated spirits and 85.7% by weight of benzene.

The following examples are given for illustrative purposes and are not intended to place any restrictions or limitations on the herein described invention.

Example I

To a mixture of 5 grams of ferrous picrate and 220 grams of picric acid were added with stirring 0.1 imperial gallon of methylated spirits and 0.9 imperial gallon of benzene, thus providing one imperial gallon of a solution containing 5.7% by weight of the mixture of ferrous picrate and picric acid. Said solution was added to a gasoline having a specific gravity of 70° Bé. in the proportion of 2.5 c.c. of solution per imperial gallon of gasoline, i. e., in the proportion of 1 volume of solution to 1817 volumes of gasoline. The resultant treated gasoline contained 0.0039% by weight of the mixture of ferrous picrate and picric acid.

*Example II*

The procedure of Example I was duplicated except that a mixture of 5 grams of the ferrous salt of 2,4,6-trinitrocresol and 220 grams of 2,4,6-trinitrocresol was substituted for the mixture of ferrous picrate and picric acid employed in Example I. The treated gasoline thus obtained contained 0.0039% by weight of the mixture of 2,4,6-trinitrocresol and ferrous salt of 2,4,6-trinitrocresol.

*Example III*

This example illustrates the improved mileage obtained with gasoline treated in accordance with this invention.

The automobile in which the test was made was a 1941 Ford Super-de-Luxe in good condition. For accurate measurement of gasoline consumption a tank of one gallon capacity was attached to the fuel line.

The first five runs recorded in the table below were made on test course I while the last two were made on test course II. Test course I was selected to give average running conditions. It was 14.8 miles long and consisted of level runs, two moderate hills, a little traffic, four 15 M. P. H. school zones, and eight stops. Test course II was a shorter course, 6.3 miles long, and included a very steep hill necessitating considerable gear shifting.

The procedure in each run was as follows:

With the stop-cock between the gallon tank and the fuel tank closed, a measured quantity of gasoline was poured into the tank. The automobile was started on the ordinary gas tank and then during idling the stop-cock to this was turned off, the stop-cock to the gallon tank was turned on, and the automobile started on the course. Before the runs the tire pressures were always checked and adjusted to 30 pounds. During the run the speed was kept constant at 30 M. P. H. except in traffic and school zones. The driving was done carefully, avoiding any sudden acceleration, and avoiding any sudden stops, thus allowing of the most economical fuel consumption. At the end of the run the ignition was switched off, the stop-cock to the gallon tank was closed, and the gasoline remaining in said tank was drained out and measured.

The same stock of ethyl gasoline was used in all of the runs. As indicated in the following table, the untreated ethyl gasoline was the fuel used during three of the runs, while in the remaining runs the fuel was said ethyl gasoline to which had been added specified amounts of solutions A or B. Solution A was an addition agent which had been prepared by adding 0.1 imperial gallon of methylated spirits and 0.9 imperial gallon of benzene, with stirring, to a catalyst which consisted of a mixture of 5 grams of ferrous picrate and 220 grams of picric acid; while solution B was an addition agent which had been obtained by adding 0.1 imperial gallon of methylated spirits and 0.9 imperial gallon of benzene with stirring to a catalyst which was a mixture of 5 grams of the ferrous salt of 2,4,6-trinitrocresol and 220 grams of 2,4,6-trinitrocresol.

| Run No. | Test Course | Vol. of Add'n Agent Added per Imperial Gallon of Gasoline | Per Cent Catalyst by Weight in Gasoline | Vol. of Gasoline Consumed (Cc.) | Miles Per Imperial Gallon |
|---|---|---|---|---|---|
| 1 | I | None | None | 2,780 | 24.2 |
| 2 | I | 2.5 cc. Sol'n A | 0.0039 | 2,660 | 25.3 |
| 3 | I | 2.6 cc. Sol'n B | 0.0041 | 2,690 | 25.0 |
| 4 | I | 6.1 cc. Sol'n A | 0.0095 | 2,670 | 25.2 |
| 5 | I | None | None | 2,780 | 24.2 |
| 6 | II | ...do... | None | 1,320 | 21.7 |
| 7 | II | 2.3 cc. Sol'n A | 0.0036 | 1,240 | 23.1 |

It was thus determined that substantially better mileage was obtained with the treated than with the untreated gasolines. In addition, each of the treated gasolines produced less knocking than did the untreated gasoline.

*Example IV*

This example illustrates the improved combustion of a gasoline treated in accordance with this invention when employed in a 1928 Buick automobile.

The engine of the Buick automobile was idled with a sample of the same untreated gasoline as was employed to prepare the product of Example I and the exhaust gas was collected and analyzed in an Orsat apparatus. Then the same procedure was repeated employing as fuel a sample of the treated gasoline of Example I. The above procedure was repeated seven times. Then the car was run at 20 M. P. H. up a long hill with treated and untreated fuel as before, four runs being made with untreated gasoline and four with treated gasoline. The results of these runs are tabulated below.

| Gasoline | Average Oxygen, Hydrogen and Carbon Monoxide Content of Exhaust Gases | | | |
|---|---|---|---|---|
| | Per Cent $O_2$ | Per Cent $H_2$ | Per Cent CO | |
| Treated | 10.4 | 0.4 | 4.7 | Buick idling. |
| Untreated | 10.5 | 1.6 | 5.2 | Do. |
| Treated | 4.5 | 0.2 | 1.4 | Buick at 20 M. P. H. |
| Untreated | 4.5 | 0.7 | 2.4 | Do. |

It was thus determined that with the automobile engine idling, the gases had from the untreated gasoline contained four times as much hydrogen and more than 10% more carbon monoxide than the exhaust gases produced under identical conditions from the corresponding untreated gasoline. With the automobile operating at 20 M. P. H., the untreated gasoline produced three and one-half times as much hydrogen and 70% more carbon monoxide than did the treated gasoline.

*Example V*

A single cylinder C. F. R. engine, compression ratio 6:1, was run on a sample of gasoline which contained tetraethyl lead and had an octane number of 75, eleven runs being made and the exhaust gases in each instance being collected and analyzed in an Orsat apparatus. A like number of runs were then made under identical conditions with the same engine employing as fuel a sample of the same gasoline to which had been added a portion of the solution A used in Example III, said solution A being added in the amount of 1 cc. per liter of gasoline, and thus providing a treated tetraethyl lead gasoline containing 0.0071% by weight of mixture of 1 part by weight of ferrous picrate and 44 parts by weight of picric acid. The average oxygen, hydrogen and carbon monoxide content of the several exhaust gases are tabulated below.

| Gasoline | $O_2$ | $H_2$ | CO |
|---|---|---|---|
|  | Per Cent | Per Cent | Per Cent |
| Treated | 1.6 | 0.6 | 1.0 |
| Untreated | 2.0 | 0.9 | 1.3 |

It is thus seen that the exhaust gases from the C. F. R. engine contained 50% more hydrogen and 30% more carbon monoxide when the gasoline employed was untreated than when it was treated according to this invention.

*Example VI*

This example illustrates the effect of the treating agents of this invention on fuel consumption and power development as measured on a dynamometer.

The engine used throughout these tests was a Standard Ford V-8, compression ratio 5.9 to 1. The dynamometer used was a Froude type hydraulic brake. The engine was coupled directly to the brake and weights were hung on the brake casing at a known leverage. When these weights were balanced and floating freely against the power exerted by the engine, observations were taken from which were calculated the load in pounds. The main supply of the gasoline being tested was contained in a tank supported on wall brackets and coupled with two 500 cc. burettes which also were filled with the gasoline being tested. Switching from one burette to the other and to the main tank was accomplished by a system of stop-cocks. For warming the engine and balancing the load the main gasoline supply was used. When an accurate balance was obtained, the supply was switched from tank to measurement burettes. The time of consumption of a given quantity of fuel was measured accurately with a stop watch; simultaneously the total number of revolutions in this period of time was recorded with an accurate revolution counter. From these observations brake horsepower and fuel consumption were computed. The maximum power that the engine could deliver without stalling on any given fuel was also determined.

A number of comparative tests were made with a sample of grade 2 gasoline having an octane-rating of 65 and with a sample of grade 1 tetraethyl lead containing gasoline having an octane-rating of 75, and with samples of said gasolines to which had been added definitely prescribed amounts of a portion of the solution A used in Example III. Solution A had been prepared by adding 0.1 imperial gallon of methylated spirits and 0.9 imperial gallon of benzene, with stirring, to a catalyst which consisted of a mixture of 5 grams of ferrous picrate and 220 grams of picric acid.

A comparative series of tests was made in the above-described manner with the grade 2 gasoline and with said gasoline to which had been added 4 c. c. of aforementioned solution A per gallon of gasoline, i. e., said gasoline contained 0.0062% by weight of a mixture of 1 part by weight of ferrous picrate and 44 parts by weight of picric acid. In this series of tests it was determined that the maximum power which could be developed by the engine was 39.5% greater when it was run on the treated gasoline than when it was operated on the corresponding gasoline untreated. Furthermore, with the treated gasoline, the engine disclosed no evidence of overheating at the highest power output. It was also determined in this series of tests that at equal brake horse powers the rate of consumption of fuel was definitely lower with the treated than with the untreated gasoline; for instance, the fuel consumption at a brake horse power of 10 was 16% lower with the treated than with the untreated gasoline.

Another comparative series of tests was made as before with the grade 1 gasoline and with said gasoline to which had been added 4 c. c. of aforementioned solution A per gallon of gasoline. In this series of tests it was also found that at equal brake horsepowers the rate of consumption of fuel was markedly lower with the treated than with the untreated gasoline; for instance, at a brake horsepower of 10 the fuel saving resulting from the addition of the ferrous picrate/picric acid solution amounted to 30%.

Another comparative series of tests was made as before with the grade 1 gasoline and with a sample of said gasoline to which had been added 3.75 c. c. of aforementioned solution A per gallon of gasoline, i. e., said gasoline contained 0.0059% by weight of the ferrous picrate/picric acid mixture. At equal brake horsepowers the rate of consumption of gasoline was appreciably lower with the treated gasoline, the fuel saving resulting from the addition of the ferrous picrate/picric acid solution to said gasoline being, for example, 14% at a brake horsepower of 29.

Another comparative series of tests was made as before with the grade 1 gasoline and with a sample of said gasoline containing 2 c. c. of aforementioned solution A per gallon of gasoline, i. e., said gasoline contained 0.0031% by weight of the ferrous picrate/picric acid mixture. In this series of tests it was also found that at equal brake horsepowers the rate of consumption of fuel by the Ford V-8 engine was markedly lower when the fuel employed was the treated gasoline than when it was said gasoline untreated; for instance, at a brake horsepower of 8 the gasoline saving resulting from the addition of the ferrous picrate/picric acid solution was 29%.

*Example VII*

The spark plugs and valves of the test engines employed in the foregoing Examples III-VI were examined carefully after many hours of running with the treated fuel and were found to be clean and free from carbon deposits. Under comparable conditions, the untreated fuel produced substantial carbon deposits on the spark plugs and valves of said engines.

*Example VIII*

A mixture of 1 part by weight of ferrous picrate and 44 parts by weight of picric acid was dissolved in a mixture of 68 parts by weight of methylated spirits and 677 parts by weight of benzene and added, with stirring, to 1,150,000 parts by weight of a tetraethyl lead containing gasoline having an octane-rating of 75. The resultant treated gasoline was found to have an octane-rating of 77.

*Example IX*

To a grade 2 gasoline having an octane-rating of 64.4 was added a portion of the solution A used in Example III, said solution being added in the amount of 2 c. c. per 500 c. c. of gasoline and thus providing a treated gasoline containing 0.028% by weight of a mixture of 1 part by weight of ferrous picrate and 44 parts by weight of picric acid. The resultant treated gasoline had an octane-rating of 64.6.

It is to be understood that I may employ a wide variety of aromatic nitro compound mixtures as catalytic agents. However, in order to obtain the beneficial results of this invention, it is critical that the catalyst employed should be a mixture of an aromatic metal-free nitro compound and an iron salt of an aromatic nitro acid. Examples of aromatic metal-free nitro compounds contemplated are: trinitrophenols, dinitrophenols, trinitrocresols, trinitroanisoles, trinitrophenetoles, picramic acid, picryl chloride, nitronaphthalene; while examples of iron salts of aromatic nitro acids are: ferrous and ferric salts of trinitrophenols, trinitrocresols, picramic acid. While appreciable effects are had with a mixture containing any aromatic metal-free nitro compound, I prefer, because of the superior results thereby obtained, to employ an aromatic metal-free nitro compound which is an aromatic nitro acid, e. g., picric acid, 2,4,6-trinitrocresol, picramic acid. Furthermore, in view of the superior properties of the resultant treated gasoline obtained therewith, I prefer to employ a mixture of an aromatic nitro acid and a ferrous salt of said acid. Mixtures of picric acid and ferrous picrate, and of 2,4,6-trinitrocresol, i. e., 1-methyl-3-hydroxy-2,4,6-trinitrobenzene, and the ferrous salt of 2,4,6-trinitrocresol, provide optimum gasoline improvement.

The ferrous picrate is preferably prepared by the method of Silberrad and Philips, Trans. Chem. Soc., Pt. 1, p. 475 (1908). The ferrous salt of 2,4,6-trinitrocresol is preferably prepared in like manner.

It is further to be understood that the ratio by weight of iron salt to aromatic metal-free nitro compound in the catalytic mixture must be within the range of from $1/5$ to $1/100$. While appreciable effects are had when said ratio is as high as $1/5$ and when it is as low as $1/100$ I prefer, on account of the superior results thereby obtained, to employ a catalytic mixture in which said ratio is within the range of from $1/35$ to $1/55$. Optimum results are obtained when said ratio is about $1/44$.

The percentage of the aforementioned catalytic mixture of aromatic metal-free nitro compound and iron salt of aromatic nitro-acid added to the liquid fuel must be very small, but it may be varied within relatively wide limits below a definite small figure. Appreciable effects are produced when as little as 0.001% of said catalytic mixture, calculated on the basis of the weight of the fuel, is added to a liquid fuel for internal combustion spark ignition engines. Appreciable effects are also obtained from the addition of as much as 0.03% of said catalytic mixture. Additions of less than 0.001% have little if any effect on the properties of the liquid fuel while additions of more than 0.03% detrimentally affect the properties of the treated fuel, lowering its antiknock rating without further decreasing fuel consumption or increasing the maximum power obtainable from the fuel. For most purposes I prefer, because of the superior results thereby obtained, to add to the liquid fuel an amount of said catalytic mixture within the range of from about 0.002% to about 0.01% based on the weight of the fuel. While amounts greater than 0.01% but not greater than 0.03% do not promote knocking, they do not decrease fuel consumption or increase the maximum power obtainable from the fuel to any greater extent than does 0.01% of the catalytic mixture. Optimum results are provided when the percentage of catalytic mixture added is within the range of from 0.003% to 0.007%, e. g., is about 0.004%.

The extremely small quantity of the mixture of aromatic metal-free nitro compound and iron salt of aromatic nitro acid present in the fuel (0.001% to 0.03% by weight) definitely places said mixture in the field of catalysts, inasmuch as the compounds contribute negligible energy of themselves to the gasoline or other liquid fuel.

The catalytic mixture of an aromatic metal-free nitro compound and an iron salt of an aromatic nitro acid should be dissolved in a suitable solvent before being added to the liquid fuel. A preferred solvent is a mixture of 1 volume of methylated spirits, i. e., grain alcohol denatured by addition thereto of a small percentage of wood alcohol, and 9 volumes of benzene. The catalytic mixture is preferably added to said solvent in amount sufficient to provide a solution containing about 6% by weight of said catalytic mixture. While a mixture of methylated spirits and benzene is preferred, any organic solvent or mixture of organic solvents which dissolves the catalytic mixture and may be introduced into an internal combustion spark ignition engine may be used. For instance, instead of the methylated spirits one may employ any lower fatty alcohol, such as methanol, ethanol, propanol, or mixtures of lower fatty alcohols. Instead of the benzene, organic solvents other than alcohols, such as ether, toluene, acetone, and the like, or mixtures of said solvents, may be used.

My new catalytic mixture possesses advantages not previously combined in a gasoline treating agent. Furthermore, the treated liquid fuels of this invention possess advantages not previously combined in a fuel for internal combustion spark ignition engines. For instance, addition to gasoline of minute proportions of the novel catalytic mixture of this invention markedly improves the combustion process of said gasoline in internal combustion spark ignition engines. The treated gasolines of this invention, when used to drive said engines, provide substantially lower percentages of poisonous carbon monoxide, hydrogen and other combustible gases in the exhaust gases, and provide a much higher output of work per unit volume of fuel consumed, e. g., higher mileage, and also improved antiknock properties. Said treated gasolines also suppress the accumulation of carbon on the interior surfaces of internal combustion engines, particularly the spark plugs, valves and cylinders thereof, and provide a substantial increase in the maximum power which a given engine can deliver without stalling, thus permitting a material reduction in the size and weight of internal combustion engines required for any given power output. This is of major importance, particularly in aeroplanes where there is such a pressing need for increased flying range and carrying capacity. Furthermore, the catalytic mixture of this invention is adapted for use in high octane as well as low octane gasolines, providing with both types, gasolines having increased octane-ratings.

As many apparently widely different embodiments of this invention may be made without departing from the spirit and scope thereof, it is to be understood that I do not limit myself to the specific embodiments thereof except as defined in the appended claims.

Having described the present invention, the following is claimed as new and useful:

1. An improved liquid fuel for internal combustion spark ignition engines comprising from 0.001% to 0.03% by weight of a mixture of an aromatic metal-free nitro compound and an iron salt of an aromatic nitro acid, the ratio by weight of iron salt to aromatic metal-free nitro compound in said mixture being within the range of from $1/10$ to $1/100$.

2. An improved liquid hydrocarbon fuel for internal combustion spark ignition engines comprising from 0.001% to 0.03% by weight of a mixture of an aromatic nitro acid and an iron salt of an aromatic nitro acid, the ratio by weight of the salt to the acid in said mixture being within the range of from $1/10$ to $1/100$.

3. An improved gasoline comprising from about 0.002% to about 0.01% by weight of a mixture of an aromatic nitro acid and a ferrous salt of said acid, the ratio by weight of the salt to the acid in said mixture being within the range of from $1/35$ to $1/55$.

4. An improved gasoline comprising from 0.003% to 0.007% by weight of a mixture of one part by weight of ferrous picrate and about 44 parts by weight of picric acid.

5. An improved gasoline comprising from 0.003% to 0.007% by weight of a mixture of about 44 parts by weight of a trinitrocresol and one part by weight of the ferrous salt of said trinitrocresol.

6. An improved gasoline comprising from 0.003% to 0.007% by weight of a mixture of one part by weight of the ferrous salt of 2,4,6-trinitrocresol and about 44 parts by weight of 2,4,6-trinitrocresol.

7. As a catalyst for improving liquid fuels for internal combustion spark ignition engines, a mixture of an aromatic metal-free nitro compound and an iron salt of an aromatic nitro acid, the ratio by weight of said salt to aromatic metal-free nitro compound in said mixture being within the range of from $1/10$ to $1/100$.

8. As a catalyst for improving gasoline, a mixture of an aromatic nitro acid and a ferrous salt of said acid, the ratio by weight of the salt to the acid in said mixture being within the range of from $1/35$ to $1/55$.

9. As a catalyst for improving gasoline, a mixture of one part by weight of ferrous picrate and about 44 parts by weight of picric acid.

10. As a catalyst for improving gasoline, a mixture of one part by weight of the ferrous salt of 2,4,6-trinitrocresol and about 44 parts by weight of 2,4,6-trinitrocresol.

11. As an addition agent for gasoline, a mixture of one part by weight of ferrous picrate and about 44 parts by weight of picric acid dissolved in a mixture of methylated spirits and benzene.

12. As an addition agent for gasoline, a mixture of one part by weight of the ferrous salt of 2,4,6-trinitrocresol and about 44 parts by weight of 2,4,6-trinitrocresol dissolved in a mixture of methylated spirits and benzene.

13. As an addition agent for liquid fuels for internal combustion spark ignition engines, a solution of a mixture of an aromatic metal-free nitro compound and an iron salt of an aromatic nitro acid in a solvent which is a mixture of methylated spirits and benzene, the ratio by weight of said salt to aromatic metal-free nitro compound in said mixture being within the range of from $1/10$ to $1/100$.

14. As an addition agent for gasoline, a mixture of an aromatic nitro acid and a ferrous salt of said acid dissolved in a mixture of methylated spirits and benzene, the ratio by weight of the salt to the acid being within the range of from $1/35$ to $1/55$.

HAROLD BOARDMAN.

No references cited.